US010770409B2

(12) United States Patent
Marzaki et al.

(10) Patent No.: US 10,770,409 B2
(45) Date of Patent: Sep. 8, 2020

(54) METHOD FOR DETECTING THINNING OF THE SUBSTRATE OF AN INTEGRATED CIRCUIT FROM ITS BACK SIDE, AND ASSOCIATED INTEGRATED CIRCUIT

(71) Applicant: STMicroelectronics (Rousset) SAS, Rousset (FR)

(72) Inventors: Abderrezak Marzaki, Aix en Provence (FR); Christian Rivero, Rousset (FR); Quentin Hubert, Marseilles (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 16/051,680

(22) Filed: Aug. 1, 2018

(65) Prior Publication Data

US 2019/0043814 A1 Feb. 7, 2019

(30) Foreign Application Priority Data

Aug. 1, 2017 (FR) ...................... 17 57372

(51) Int. Cl.
*G06K 19/073* (2006.01)
*G06F 21/75* (2013.01)
*H01L 23/00* (2006.01)
*H01L 27/02* (2006.01)

(52) U.S. Cl.
CPC ............ *H01L 23/576* (2013.01); *G06F 21/75* (2013.01); *G06K 19/07381* (2013.01); *H01L 27/0285* (2013.01)

(58) Field of Classification Search
CPC . H01L 23/567; H01L 23/576; H01L 27/0285; H01L 22/34; G06F 21/75; G06K 19/07381
See application file for complete search history.

(56) References Cited

U.S. PATENT DOCUMENTS

| 2010/0283456 | A1 | 11/2010 | Zieren et al. |
| 2012/0320480 | A1 | 12/2012 | Lisart et al. |
| 2014/0138686 | A1 | 5/2014 | Wuidart et al. |
| 2014/0375341 | A1* | 12/2014 | Fender .................... H01L 22/34 324/693 |

(Continued)

FOREIGN PATENT DOCUMENTS

CN 205828352 U 12/2016

OTHER PUBLICATIONS

INPI Search Report and Written Opinion for FR 1757372 dated Jun. 4, 2018 (9 pages).

*Primary Examiner* — Allen L Parker
*Assistant Examiner* — Gustavo G Ramallo
(74) *Attorney, Agent, or Firm* — Crowe & Dunlevy

(57) ABSTRACT

An integrated electronic circuit includes a semiconductor substrate with a semiconductor well that is isolated by a buried semiconductor region located under the semiconductor well. A vertical MOS transistor formed in the semiconductor well includes a source-drain region provided by the buried semiconductor region. Backside thinning of the semiconductor substrate is detected by biasing the vertical MOS transistor into an on condition to supply a current and then comparing that current to a threshold. Current less than a threshold is indicative that the semiconductor substrate has been thinned from the backside.

15 Claims, 3 Drawing Sheets

(56) References Cited

U.S. PATENT DOCUMENTS

| | | | |
|---|---|---|---|
| 2016/0155506 A1* | 6/2016 | Tailliet | G11C 16/0408 |
| | | | 365/185.05 |
| 2016/0307855 A1* | 10/2016 | Charbonnier | H01L 23/573 |
| 2017/0243652 A1* | 8/2017 | Fornara | G11C 16/22 |
| 2018/0247901 A1* | 8/2018 | Marzaki | H01L 23/573 |

* cited by examiner

METHOD FOR DETECTING THINNING OF THE SUBSTRATE OF AN INTEGRATED CIRCUIT FROM ITS BACK SIDE, AND ASSOCIATED INTEGRATED CIRCUIT

PRIORITY CLAIM

This application claims the priority benefit of French Application for Patent No. 1757372, filed on Aug. 1, 2017, the content of which is hereby incorporated by reference in its entirety to the maximum extent allowable by law.

TECHNICAL FIELD

Implementations and embodiments relate to integrated circuits, and more particularly to the detection of possible thinning of the substrate of an integrated circuit from its back side.

BACKGROUND

Integrated circuits, in particular those equipped with memories containing sensitive information, must, as much as possible, be protected from attacks, in particular attacks intended to discover the data stored in memory.

One possible type of attack may be carried out from the back side of an integrated circuit, using a laser beam.

The effectiveness of such an attack increases when the substrate of the integrated circuit is thinned by the attacker from its back side so as minimize the distance through the substrate to the components of the integrated circuit produced on its front side. The integrated circuit may, for example, be thinned from the back side using a focused ion beam (FIB) and/or using a polishing/grinding step.

Means allowing thinning of the substrate from its back side to be detected do exist. This being so, these means sometimes have a low degree of integration, and may sometimes disrupt operation of components located nearby.

These existing means may, for example, detect a variation in resistance with the thinning of the substrate. This being so, this type of solution may be a source of errors, in particular in integrated circuits where the temperature is allowed to vary which results in a variation in resistance value even in the absence of thinning.

SUMMARY

According to one embodiment, an integrated circuit is provided including means for detecting thinning of the substrate from its back side, having a high degree of integration and a very low false detection rate.

According to one aspect, a method is provided for detecting possible thinning of a semiconductor substrate of an integrated circuit from its back side. The substrate comprises a semiconductor well that is isolated from the rest of the substrate by at least one buried semiconductor layer that is at least partially produced under the semiconductor well. The method comprises: producing, in the semiconductor well, a vertical MOS transistor including a first semiconductor electrode region located on the front side of the substrate, and an insulated vertical gate region extending between the first semiconductor electrode region and the buried semiconductor layer, the latter including a second semiconductor electrode region of the vertical transistor; biasing the vertical transistor to a state corresponding to an on state of the transistor; comparing the current delivered by one of the semiconductor electrode regions of the vertical transistor with a threshold value; and generating a control signal having a first value corresponding to detection of non-thinning of the substrate if the value of said current is higher than the threshold value, and having a second value corresponding to detection of thinning of the substrate if the value of the current is lower than the threshold value.

The semiconductor well may comprise at least one first MOS transistor including a semiconductor electrode region that is common with said first semiconductor electrode region of the vertical transistor. The method further comprises, after detection of non-thinning of the substrate, deactivating the comparison of the value of said current to said threshold value.

According to another aspect, an integrated electronic circuit is provided, said integrated electronic circuit including a semiconductor substrate of a first conductivity type comprising a semiconductor well that is isolated from the rest of the substrate by at least one buried semiconductor layer of a second conductivity type opposite the first conductivity type, said layer being at least partially produced under the semiconductor well.

The electronic circuit includes a device for detecting thinning of the substrate from its back side, including: a vertical MOS transistor including a first semiconductor electrode region located on the front side of the substrate, and an insulated vertical gate region extending between the first semiconductor electrode region and the buried semiconductor layer, the latter including a second semiconductor electrode region of the vertical transistor; a biasing circuit configured to bias the vertical transistor, said biasing circuit being configured to, in a first configuration, apply, to the vertical transistor, biases corresponding to an on state of this transistor; and a comparing circuit that is coupled to one of said semiconductor electrode regions of the vertical transistor and configured to compare the current delivered by said semiconductor electrode region of the vertical transistor with a threshold value and to generate a control signal having a first value corresponding to detection of non-thinning of the substrate if the value of said current is higher than the threshold value, and having a second value corresponding to detection of thinning of the substrate if the value of the current is lower than the threshold value.

In other words, the integrated circuit includes a vertical transistor that extends into the well, and through which a current may flow. Thinning of the substrate from its back side damages the vertical transistor, thus preventing the current from flowing through the transistor.

It is therefore possible to reliably detect, while decreasing the footprint of the detecting device, whether thinning of the substrate has taken place.

According to one embodiment, the comparing circuit is electrically coupled to the first semiconductor electrode region of the vertical transistor, and are configured to compare the current delivered by said first semiconductor electrode region of the vertical transistor with said threshold value.

According to another possible embodiment, the comparing circuit is electrically coupled to the second semiconductor electrode region of the vertical transistor, and are configured to compare the current delivered by said second semiconductor electrode region of the vertical transistor with said threshold value.

The semiconductor well may comprise at least one first MOS transistor including a semiconductor electrode region that is common with said first semiconductor electrode region of the vertical transistor, the device being able to be in the first configuration, in which the comparing circuit is activated, or in a second configuration, in which the comparing circuit is deactivated, and the integrated circuit further comprises a control circuit that is configured to make the device pass from its first configuration to its second configuration after detection of non-thinning of the substrate.

Thus, the vertical transistor may advantageously have two functions, namely a thinning-detection function and a conventional vertical-transistor function.

Said common semiconductor electrode region may be devoid of contact, and the biasing circuit may then be configured to, in the first configuration, apply, to the first vertical transistor, biases corresponding to an on state of this transistor.

Thus, since the first transistor and the vertical transistor are mounted in series, there is no need to produce a contact on the common semiconductor electrode region, this advantageously saving space and simplifying the design of integrated circuit.

According to one embodiment, the integrated circuit includes an insulated vertical electrode extending from the front side of the substrate to the buried semiconductor layer and including the gate region of the vertical transistor.

Thus, the device may be produced by simply adding, to the well, an insulated vertical electrode and a buried semiconductor layer; it therefore has a very good degree of integration, and disrupts other components less.

According to one embodiment, the well is encircled by a trench isolation, and the insulated vertical electrode extends in part through the trench isolation.

Since etching is faster through a trench isolation, this advantageously allows a deeper electrode to be produced, in the same etching time.

According to another embodiment, the insulated vertical electrode extends only into the semiconductor well and further comprises a semiconductor segment of the same conductivity type as the buried semiconductor layer, extending from the insulated vertical electrode to the buried semiconductor layer.

The semiconductor segment thus forms an extension of the buried semiconductor layer reaching as far as to the insulated vertical electrode, and therefore allows the vertical transistor to be produced despite the fact that the electrode does not extend as far as to the buried semiconductor layer.

BRIEF DESCRIPTION OF THE DRAWINGS

Other advantages and features of the invention will become apparent on examining the detailed description of completely non-limiting implementations and embodiments and the appended drawings, in which.

DETAILED DESCRIPTION

Figure 1:
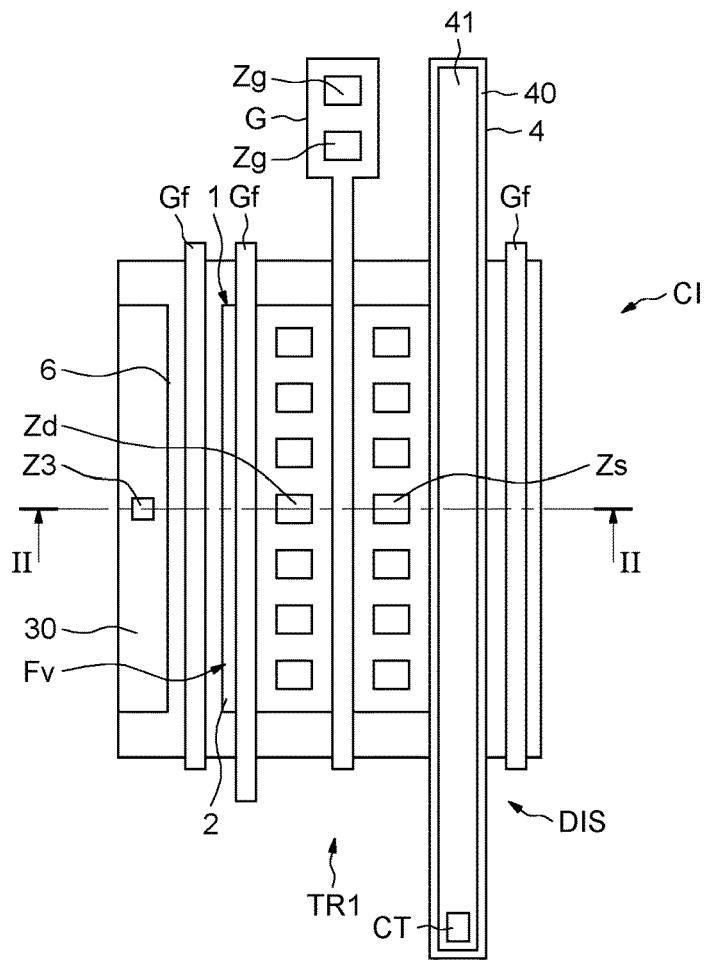
FIG. 1 is a top view of a segment of an integrated circuit.
Figure 2:
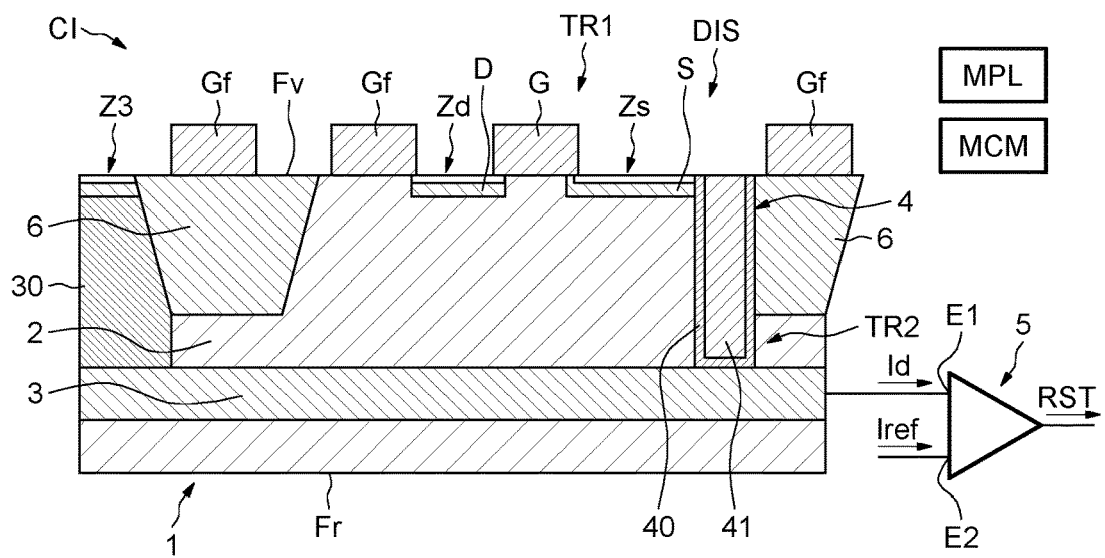
FIG. 2 shows a view of a cross-section of FIG. 1.

FIG. 1 illustrates a top view of a segment of an integrated circuit CI and FIG. 2 shows a view of a cross-section thereof cut along the line II-II in FIG. 1.

The integrated circuit CI includes a semiconductor substrate 1 including a front side Fv and a back side Fr and a device DIS for detecting thinning of the substrate 1 from its back side.

The semiconductor substrate 1 here includes a first semiconductor well 2 having a first conductivity type, here a p-type conductivity, and electrically isolated from the rest of the substrate.

A shallow trench isolation 6 (STI), for example a trench including silicon oxide, is produced around the first semiconductor well 2, and a buried semiconductor layer 3 comprising a semiconductor having a second conductivity type opposite the first conductivity type, here silicon having a conductivity of n-type, is produced under the first semiconductor well 2. This buried layer 3 is commonly referred to by those skilled in the art as a "NISO layer".

The shallow trench isolation 6 and the buried semiconductor layer 3 contribute to the isolation of the well 2 from the rest of the substrate.

A second semiconductor well 30, of the same conductivity type as that of the buried layer 3, here an n-type conductivity, is produced beside the semiconductor well 2, and is separated from the first semiconductor well 2 by the trench isolation 6.

This second semiconductor well 30, the top portion of which is here silicided, allows a contact region Z3 to be produced on the front side Fv of the substrate. The contact Z3 is coupled to a biasing circuit MPL of conventional structure, which is configured to bias the semiconductor layer 3. During normal operation of the integrated circuit CI, the contact region Z3 is typically biased to a supply voltage of the circuit.

A first NMOS transistor TR1 is produced in and on the first well 2. The first transistor TR1 is, for example, here a transistor forming part of a memory zone of the integrated circuit CI, and participates in the storage of secure data.

The first transistor TR1 conventionally includes a gate region G, or gate line, for example including polysilicon, and that is produced on a thin insulating layer, for example a layer of silicon oxide.

The first transistor TR1 includes a first semiconductor electrode region D including a first segment of the first well 2, which segment is doped the conductivity type opposite that of the well 2, here n-type, here forming the drain of the first transistor TR1, and a second semiconductor electrode region S including a second segment of the first well 2, which segment is doped the conductivity type opposite that of the well 2, here n-type, here forming the source of the first transistor TR1, these segments being produced on either side of the gate region G.

Here the gate is biased via two contacts Zg placed on the silicided upper portion of the gate line G.

A plurality of drain contacts Zd on the silicided upper portion of the first semiconductor electrode region D, and a plurality of source contacts Zs on the silicided upper portion of the second semiconductor electrode region S, are, just like the contacts Zg, coupled to the biasing circuit MPL and, conventionally, allow the gate, source and drain regions to be independently biased, in the context of conventional operation of the first transistor TR1.

A plurality of dummy gate regions Gf are here produced on the front side Fv of the substrate, on either side of the gate region G of the first transistor TR1. These dummy gates Gf are used to increase the uniformity in thickness of certain layers of material in deposition, photolithography and etching steps during the fabrication process of the integrated circuit CI, and here have no electrical role.

In order to check whether an attacker has thinned the substrate from its back side, for example with the aim of intercepting, during operation of the integrated circuit CI, secure data such as for example cipher keys, the integrated circuit CI includes a device DIS for detecting thinning of the substrate 1 from its back side Fr.

The detecting device DIS is, for example, configured in a first configuration in which it is activated on turn-on of the integrated circuit CI. If, during the activation period of the device DIS, no thinning is detected, the device DIS is placed in a second configuration in which it is deactivated and the integrated circuit starts up in its normal operating mode.

The device DIS may also pass from the second configuration to the first configuration during the normal operation of the integrated circuit CI, for example during a period in which the first transistor TR1 is not being used to carry out operations of the integrated circuit CI, then pass back from the first configuration to the second configuration if no thinning is detected.

Control circuit MCM, for example a logic circuit, allows the device DIS to be placed in its first configuration or in its second configuration.

If thinning of the substrate is detected, a control signal RST is generated and sent to a control unit (not shown) of the integrated circuit CI, and in response thereto, for example, the secure data stored in the integrated circuit CI are erased and the integrated circuit CI is reset.

The device DIS includes an insulated vertical electrode 4 produced in the semiconductor well 2 so as to extend from the front side Fv to the semiconductor layer 3.

The vertical electrode 4 comprises a trench including an insulating partition 40, for example here of silicon dioxide, and filled with a conductor 41, here for example polysilicon.

The vertical electrode 4 includes an electrode contact region CT that is coupled to the biasing circuit MPL and that allows the vertical electrode 4 to be biased.

In this example, the insulated vertical electrode 4 is produced partially through the trench isolation 6, and partially through the semiconductor substrate 2.

Producing the vertical electrode through the trench isolation 6 advantageously allows a deeper trench, and therefore a longer electrode, to be produced. Specifically, the etch rate of the silicon oxide of the trench isolation 6 is higher than the etch rate of the silicon of the well. Thus, for a given etching time, the etch will be deeper if it is carried out through a trench isolation.

The protecting device DIS includes a vertical transistor TR2.

The insulated vertical electrode 4 here comprises the gate of the transistor TR2, the second electrode of the first transistor TR1 forms the drain region of the vertical transistor TR2, and the semiconductor region 3 comprises the source region of the transistor TR2.

The device DIS also includes a comparator 5, a first input E1 of which is electrically coupled to the semiconductor layer 3, and a second input E2 of which is configured to receive a reference current Iref, for example a current of two nano-amps.

The comparator 5 includes an output configured to deliver the control signal RST having a first value, for example a value of zero, if a current supplied to the first input E1 has a value higher than or equal to the value of the reference current Iref supplied to its second input E2, and to deliver the control signal RST having a second value, for example a nonzero value, if the current supplied to the first input E1 has a value lower than the reference current Iref supplied to the second input E2.

When the comparator 5 is deactivated (second configuration of the device DIS), the semiconductor layer 3 is connected to ground, left floating or biased to a given voltage, and the insulated vertical electrode 4 is for example, but without limitation, connected to ground.

During operation of the protecting device DIS (first configuration of the device DIS), the biasing circuit MPL applies, to the vertical transistor TR2, a bias corresponding to an on state of this transistor.

Here, the biasing circuit MPL is suitable for coupling, to ground, the second electrode S of the first transistor, which here forms the source or drain region of the vertical transistor TR2, and for biasing the semiconductor layer 3 to a first value, for example 1.2 volts.

The insulated vertical electrode 4 is, for its part, biased to a second value, for example 3.5 volts, and the second input E2 of the comparator 5 receives the reference current Iref.

Thus, the vertical transistor TR2 is biased with the biasing circuit MPL so that its gate-source voltage is higher than its threshold voltage, and a detection current Id flows through the semiconductor well 2 between the second electrode S and the semiconductor layer 3. For example, here the detection current Id has a value of ten micro-amps.

The comparator 5, the first input of which receives the detection current Id, then delivers the control signal RST having for example a low value.

On reception of the control signal RST having, for example, a low value, the control circuit MCM deactivates the device DIS and the integrated circuit starts up its normal operation.

It would also be possible to envisage a device devoid of contacts on the second semiconductor electrode region S of the first transistor TR1, and, during operation of the device DIS, to couple the first semiconductor electrode region D of the first transistor TR1 to ground, and the buried semiconductor layer 3, the gate G of the first transistor TR1 and the insulated vertical electrode 4 to the first value.

Thus, the detection current Id would flow through the first transistor TR1 and through the vertical transistor TR2.

It would be possible for the biasing circuit MPL to be suitable for biasing, to the first value, the second electrode S of the first transistor, which would then form the source region of the vertical transistor TR2, and to couple, to ground, the semiconductor layer 3, which would then form the drain region of the vertical transistor TR2.

Moreover, it should be noted here that the current and voltage values are given by way of indication, and that the operation of the detecting device is not limited to these values.

Figure 3:
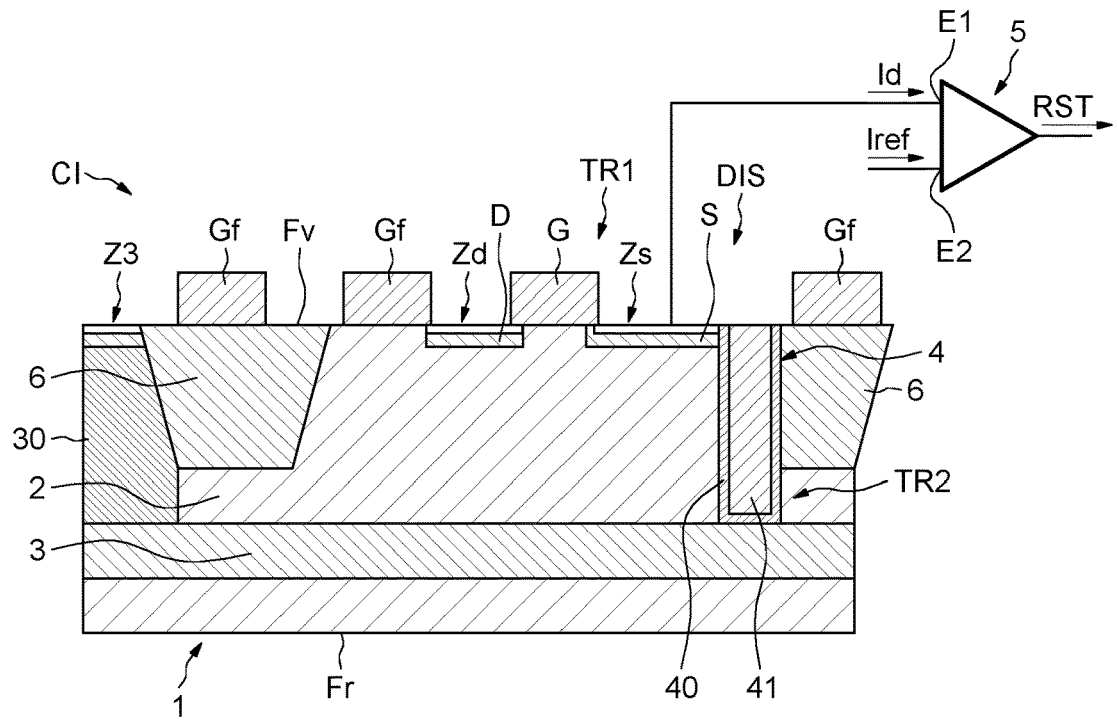
FIG. 3 illustrates an alternative implementation.

Furthermore, as illustrated in FIG. 3, it would also be possible for the first input E1 of the comparator 5 to be coupled to the first semiconductor electrode region D of the vertical transistor TR2. This being so, for the sake of simplicity, the rest of the description will refer to the embodiment described above with regard to FIGS. 1 and 2.

The operations of interception of secure data require, in order to be effective, the substrate to be as thin as possible, in order to allow the data-intercepting devices to be brought as close as possible to the components. Thus, the thinning of the substrate 1, for example with a focused ion beam, may extend as far as into the well 2, beyond the semiconductor layer 3.

Figure 4:
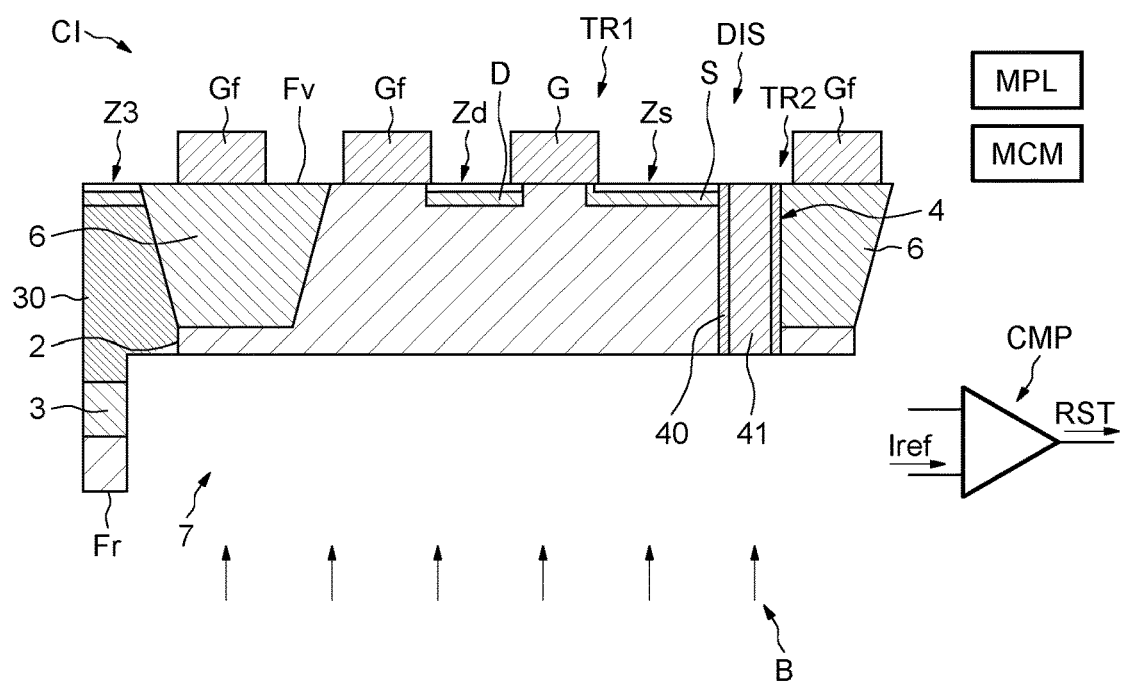
FIG. 4 illustrates the integrated circuit after the substrate has been partially thinned.

FIG. 4 illustrates the integrated circuit CI after the substrate has been partially thinned. Following this thinning, the substrate 2 includes a cavity 7 extending from the back side Fr of the substrate, to the semiconductor well 2.

The cavity 7 therefore passes through the semiconductor layer 3, and coupling between the semiconductor layer 3 and the first input E1 of the comparator 5 is no longer ensured.

By way of indication, the cavity extends over an area of about twenty five microns squared, i.e. an area larger than the area of the semiconductor layer 3 located inside the trench isolation 6, which here is about nine microns squared.

Thus, even if the second electrode S, the insulated vertical electrode 4, and the semiconductor 3 are biased so that the gate-source voltage of the vertical transistor TR2 is higher than its threshold voltage, the current supplied to the first input E1 of the comparator 5 is very low, and the value of the control signal RST generated by the comparator 5 is for example high.

On reception of the control signal RST having the for example high value, the control unit of the integrated circuit may, for example, erase the secure data, and reset or turn off the integrated circuit CI.

Thus, the integrated circuit CI is protected from attacks including a thinning of the substrate.

In addition, the small size of the insulated vertical electrode 4 advantageously allows a very good degree of integration of the detecting device.

Moreover, the inventors have observed that the variation in the threshold voltage of the first transistor TR1 with respect to its threshold voltage in the absence of the vertical electrode is smaller than three percent.

Figure 5:
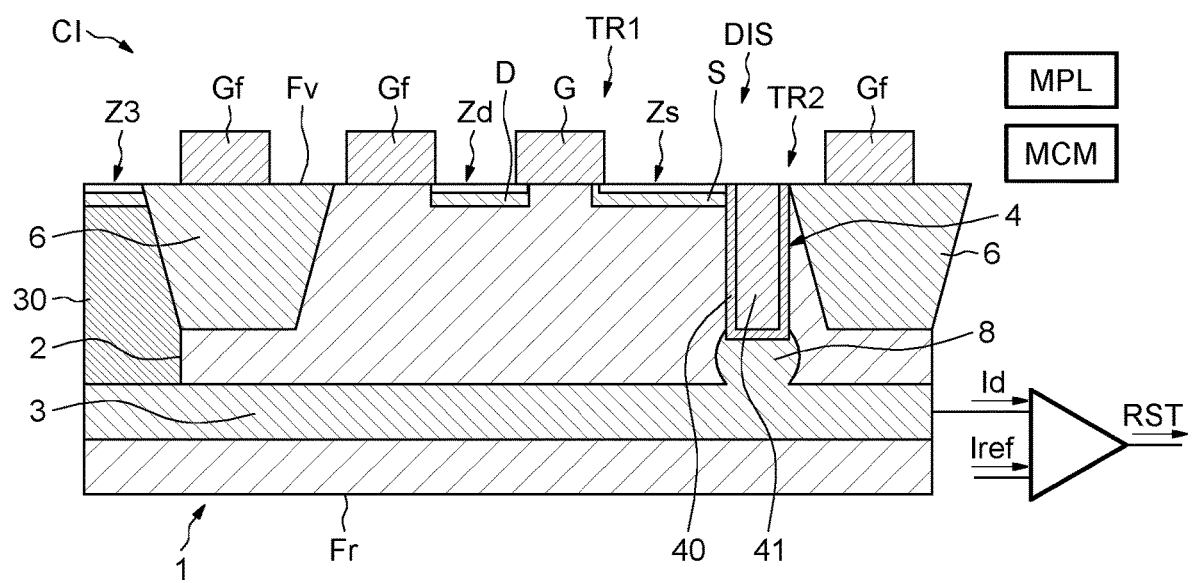
FIG. 5 illustrates a further alternative implementation.

Although an integrated circuit CI in which the insulated vertical electrode 4 extends through the trench isolation 6 has been described, it would be entirely possible, as illustrated in FIG. 5, to produce an insulated vertical electrode 4 that extends only into the semiconductor well 2, for example between the second electrode S and the trench isolation 6.

In this case, the trench in which the vertical electrode 4 is produced is etched more slowly, and therefore extends less deeply into the substrate. In order to produce the contact between the vertical electrode 4 and the semiconductor layer 3, it is possible, prior to the production of the insulating partition 40, to produce an implant of the same conductivity type as that of the semiconductor layer 3, here n-type, in that segment 8 of the well which is located between the vertical electrode 4 and the semiconductor layer 3.

Thus, an extension of the vertical region is formed allowing electrical contact between the semiconductor layer 3 and the vertical electrode 4.

Although a detecting device including a vertical transistor TR2 the drain of which comprises the source of the first transistor TR1 has been described with reference to FIGS. 1 to 5, it would be entirely possible to envisage a device DIS in which the vertical electrode 4 is located on the other side of the gate G, and in which the drain or source of the vertical transistor comprises the drain or source of the first transistor TR1.

Furthermore, although a well 2 including only the first transistor TR1 has been described, it is possible to produce a protecting device produced in a well in which a plurality of transistors are produced.

It is also possible to produce a protecting device common to a plurality of semiconductor wells of the same conductivity.

The invention claimed is:

1. A method for detecting back side thinning of a semiconductor substrate of an integrated circuit, wherein the semiconductor substrate includes a semiconductor well isolated by a buried semiconductor layer located under the semiconductor well, the method comprising:
producing, in the semiconductor well, a vertical MOS transistor including a first semiconductor electrode region located on a front side of the semiconductor substrate, and an insulated vertical gate region extending between the first semiconductor electrode region and the buried semiconductor layer which includes a second semiconductor electrode region of the vertical MOS transistor;
biasing the vertical MOS transistor to a transistor on state;
comparing a current delivered by one of the first and second semiconductor electrode regions of the vertical MOS transistor in an on state with a threshold value; and
generating a control signal having a first value corresponding to detection of non-thinning of the semiconductor substrate if the value of said current is higher than the threshold value, and having a second value corresponding to detection of thinning of the semiconductor substrate if the value of the current is lower than the threshold value.

2. The method according to claim 1, further comprising: deactivating the comparison of the value of the current to said threshold value in response to the control signal having the first value.

3. The method according to claim 1, wherein comparing comprises comparing the current delivered by said first semiconductor electrode region with said threshold value.

4. The method according to claim 1, wherein comparing comprises comparing the current delivered by said second semiconductor electrode region with said threshold value.

5. An integrated electronic circuit, comprising:
a semiconductor substrate, including a semiconductor well of a first conductivity type that is isolated by a buried semiconductor layer of a second conductivity type opposite the first conductivity type, said buried semiconductor layer located under the semiconductor well; and
a device configured to detect back side thinning of the semiconductor substrate, comprising:
a vertical MOS transistor including a first semiconductor electrode region located on a front side of the semiconductor substrate, and an insulated vertical gate region extending between the first semiconductor electrode region and the buried semiconductor layer which includes a second semiconductor electrode region of the vertical MOS transistor;
a biasing circuit configured to bias the vertical MOS transistor in an on state; and
a comparing circuit coupled to one of the first and second semiconductor electrode regions and configured to compare a current delivered by said one of the first and second semiconductor electrode regions in the on state with a threshold value and to generate a control signal having a first value corresponding to detection of non-thinning of the semiconductor substrate if the value of said current is higher than the threshold value, and having a second value corresponding to detection of thinning of the semiconductor substrate if the value of the current is lower than the threshold value.

6. The integrated circuit according to claim 5, wherein the comparing circuit is electrically coupled to the first semiconductor electrode region and is configured to compare the current delivered by said first semiconductor electrode region with said threshold value.

7. The integrated circuit according to claim 5, wherein the comparing circuit is electrically coupled to the second semiconductor electrode region and is configured to compare the current delivered by said second semiconductor electrode region with said threshold value.

8. The integrated circuit according to claim 5, further comprising at least one MOS transistor on and in the semiconductor well, the at least one MOS transistor including a third semiconductor electrode region that is shared in common with said first semiconductor electrode region.

9. The integrated circuit according to claim 8, wherein the third semiconductor electrode region that is shared in common with said first semiconductor electrode region is not biased by the biasing circuit.

10. The integrated circuit according to claim 5, wherein the comparing circuit is operable in a first configuration where the comparison is actuated and a second configuration where the comparison is deactuated, further comprising a control circuit configured to cause a transition from the first configuration to the second configuration in response to the control signal having the first value.

11. The integrated circuit according to claim 5, wherein the insulated vertical gate region comprises an insulated vertical electrode that extends from a front side of the semiconductor well to the buried semiconductor layer and provides a gate region of the vertical MO S transistor.

12. The integrated circuit according to claim 11, wherein the semiconductor well is encircled by a trench isolation, and wherein the insulated vertical electrode extends in part through the trench isolation.

13. The integrated circuit according to claim 11, wherein the insulated vertical electrode extends into the semiconductor well without reaching the buried semiconductor layer, the insulated vertical gate region further comprising a semiconductor segment of the same conductivity type as the buried semiconductor layer which extends from a bottom of the insulated vertical electrode to the buried semiconductor layer.

14. A method for detecting back side thinning of a semiconductor substrate of an integrated circuit, wherein the semiconductor substrate includes:
    a semiconductor well isolated by a buried semiconductor layer located under the semiconductor well; and
    a vertical MOS transistor including a first semiconductor electrode region located on a front side of the semiconductor substrate, and an insulated vertical gate region extending between the first semiconductor electrode region and the buried semiconductor layer which includes a second semiconductor electrode region of the vertical MOS transistor;
    the method comprising:
    biasing the vertical MOS transistor to a transistor on state;
    comparing a current flowing between the first and second semiconductor electrode regions of the vertical MOS transistor with a threshold value when the vertical MOS transistor is biased in the on state; and
    generating a control signal having a first value corresponding to detection of non-thinning of the semiconductor substrate if the value of said current is higher than the threshold value, and having a second value corresponding to detection of thinning of the semiconductor substrate if the value of the current is lower than the threshold value.

15. The method according to claim 14, further comprising: deactivating the comparison of the value of the current to said threshold value in response to the control signal having the first value.

\* \* \* \* \*